United States Patent [19]
Gnezdilov

[11] Patent Number: 5,758,582
[45] Date of Patent: Jun. 2, 1998

[54] DEVICE FOR RESTRAINING PEOPLE ON A MOVING UNIT

[76] Inventor: Vladimir A. Gnezdilov, kv. 179, Kastanayevskaya, 60, Moscow, 121108, Russian Federation

[21] Appl. No.: 747,582

[22] Filed: Nov. 13, 1996

[30] Foreign Application Priority Data

Sep. 26, 1996 [SU] U.S.S.R. .................. 96119201

[51] Int. Cl.⁶ .................................. A62B 35/00
[52] U.S. Cl. .................. 104/241; 104/53; 297/486; 297/488
[58] Field of Search ............... 107/53, 63, 241; 244/121, 122 R; 297/486, 487, 488; 280/748, 751

[56] References Cited

U.S. PATENT DOCUMENTS

| | | | |
|---|---|---|---|
| 4,531,459 | 7/1985 | Yamada | 104/53 |
| 4,700,632 | 10/1987 | Schmutz | 104/53 |
| 5,218,910 | 6/1993 | Mesmer et al. | 104/63 |
| 5,433,153 | 7/1995 | Yamada | 104/241 |
| 5,454,596 | 10/1995 | Dirck | 104/241 |
| 5,499,844 | 3/1996 | Dirck | 280/748 |
| 5,527,223 | 6/1996 | Kitchen et al. | 472/118 |
| 5,586,503 | 12/1996 | Rehorn | 104/241 |

FOREIGN PATENT DOCUMENTS

62-270189  11/1987  Japan.

OTHER PUBLICATIONS

Rotoshake, backcover advertisement on Amusement Business Convention Special, for IAPPA Convention in New Orleans, published Nov. 15, 1995 (back page and cover page enclosed).

InterPark, IAPPA New Orleans Convention Journal, cover sheet, Nov. 1996, published by InterGame Ltd., 4 Southlink Business Park, Hamilton Street, Oldham, Lancashire, England. ISSN – 1359–6284.

Wilde Maus "MACK", Karussell und Fahrzeugfabrik Parkeinrichtungen Heinrich Mack GmbH & Co. Mauermattenstrasse 4, D–79183 Waldkirch, 4 pages, Nov. 17, 1995.

Bobbahn, Bobsled, "MACK", Karussell und Fahrzeugfabrik Parkeinrichtungen Heinrich Mack GmbH & Co. Mauermattenstrasse 4, D–79183 Waldkirch, 4 pages, Nov. 17, 1995.

*Primary Examiner*—S. Joseph Morano
*Attorney, Agent, or Firm*—Frishauf, Holtz, Goodman, Langer & Chick, P.C.

[57] ABSTRACT

A restraining device for restraining a passenger on a moving unit includes a passenger body enveloping unit having two side components each having a front end and a back end. The back end of each of the side components is joined to hinges fixed in an upper portion of a back of a seat of the moving unit, and the front end of each of the side components are connected together to form a space for enveloping the passenger. A transverse component rigidly fastened to the passenger body enveloping unit rests against the passenger's thighs when the passenger body enveloping unit envelops the passenger. A lock unit restrains the passenger body enveloping unit after the transverse component has come to rest against the passenger's thighs such that the passenger body enveloping unit envelops the passenger in an area of the passenger's forearms and belly.

20 Claims, 9 Drawing Sheets

DEVICE FOR RESTRAINING PEOPLE ON A MOVING UNIT

FIELD OF THE INVENTION

The invention relates to transportation means and particularly to Roller Coaster cars, and comprises a device for restraining passengers in their seats on the cars during the movement of the cars along a ride track.

DESCRIPTION OF THE RELATED ART

Well known are devices for restraining people on a moving vehicle comprising a clamping arc with side components whose upper ends are hinged on the frame of the car body. When turning about the hinge axis the clamping arc by means of its roller (the transverse component) presses the passenger against the chair in the area of the upper part of the thighs (groin). Following this, the clamping arc is fastened by means of a locking device which can be unlocked only at the end of the ride. A shortcoming of these devices is that the upper part of the passenger body is not restrained in its displacements (in particular, sideways). Thus, the passenger can be injured or even slip out of the chair.

Also well known are devices for restraining people on a moving vehicle comprising a clamping arc with side components whose upper ends are hinged on the upper part of the back of a chair fastened on the unit frame, and which are connected with the clamping arc lock, wherein the lower part of the clamping arc lock is provided with a transverse component used as a stop against a passenger's thighs (see, for example, Patent Application N 62-270189 A63G 21/04, Japan, 1987).

Such devices do not provide passengers with sufficient safety and comfort during movement along complex paths. The clamping arc passing through the shoulders presses down on them, and the transverse component does not rest against the passenger's thighs if the passenger is tall. If the passenger is short or is a child, moreover, the upper part of the body is not protected and the head is subject to the risk of injury when bumping against the upper part of the clamping arc. In both cases the passenger's safety is not guaranteed as the passenger can lean sideways and get free of the restraint (slip out sideways). Also with this type of clamping arc it is impossible to provide the passenger's restraint in the area of the upper part of the thighs, which is the most reliable area, and to simultaneously limit the displacement of the upper part of the body sideways in the required range of passengers' anthropometric characteristics without adjusting the clamping arc dimensions and the position of the place where the clamping arc is fastened to the chair, which complicates the structure considerably. Moreover, as a rule such a clamping arc is secured by means of sophisticated devices comprising hydraulic or pneumatic components.

SUMMARY OF THE INVENTION

It is, therefore, an object of the present invention to provide a new and improved device for restraining people on a moving unit which ensures reliable and safe restraining of passengers on a moving unit.

In order to achieve this object, there is provided a device for restraining people on a moving unit (a Roller Coaster car), equipped with a seat with a back in whose upper part the restraining device is secured, said restraining device comprising:

a passenger body enveloping unit comprising two side components each having a front and a back end, the back ends of each component being connected to hinges fixed in the upper part of the back, and the front ends being connected together by means of a transverse component, the space formed by the side components being designed for enveloping the passenger's body;

a transverse component for resting against the passenger's thighs and rigidly fastened to the enveloping unit; and a lock unit for restraining the body enveloping unit after the transverse component has stopped against the passenger's thighs;

wherein the enveloping unit envelops, after the transverse component has stopped against the passenger's thighs, the passenger's body in such a way that it passes in the area of the passenger's forearms and belly. In addition to the object stated above the present invention solves another problem, namely, it provides a new and improved device that is simpler and cheaper in comparison to the existing ones, while ensuring greater safety and reliability. According to the invention, there is provided a device for restraining people on a moving unit (a Roller Coaster car), equipped with a seat with a back in whose upper part the restraining device is secured, said restraining device comprising: a passenger body enveloping unit in the form of an arc-like component comprising a front part, two side parts and two ends, each of the ends being connected to hinges fixed in the upper part of the back, the space formed by the arc-like component being intended for enveloping the passenger's body;

a transverse component for resting against the passenger's thighs and rigidly fastened to the enveloping unit; and a lock unit for restraining the body enveloping unit after the transverse component has stopped against the passenger's thighs;

wherein the enveloping unit envelops, after the transverse component has stopped against the passenger's thighs, the passenger's body in such a way that the side components pass in the area of the passenger's forearms and the front part passes in the area of the passenger's belly.

In addition to the objects stated above the present invention solves another problem, namely, it provides a new and improved device for restraining people on a moving unit that ensures greater safety and reliability and which is equipped with handles which the passenger can grasp during motion, wherein the handles are rigidly connected to the body enveloping unit, and the handles are made in the form of components that rigidly connect the body enveloping unit with the transverse component for resting against thighs.

It is one more object of the invention to provide a new and improved unit for restraining people on a moving unit providing greater safety and comfort, in which the maximum distance between the side components exceeds the width of the passenger's body in the area of the passenger's forearms.

It is one more object of the invention to provide a new and improved unit for restraining people on a moving unit providing greater safety and comfort that is simpler and cheaper in comparison to the existing ones, in which the body enveloping unit and the transverse component for resting against the thighs are coated with an elastic material, the material being integral foam polyurethane.

Additional objects and advantages of the invention will be set forth in the description which follows, and in part will be obvious from the description, or may be learned by practice of the invention. The objects and advantages of the invention may be realised and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENT OF THE INVENTION

Figure 1:
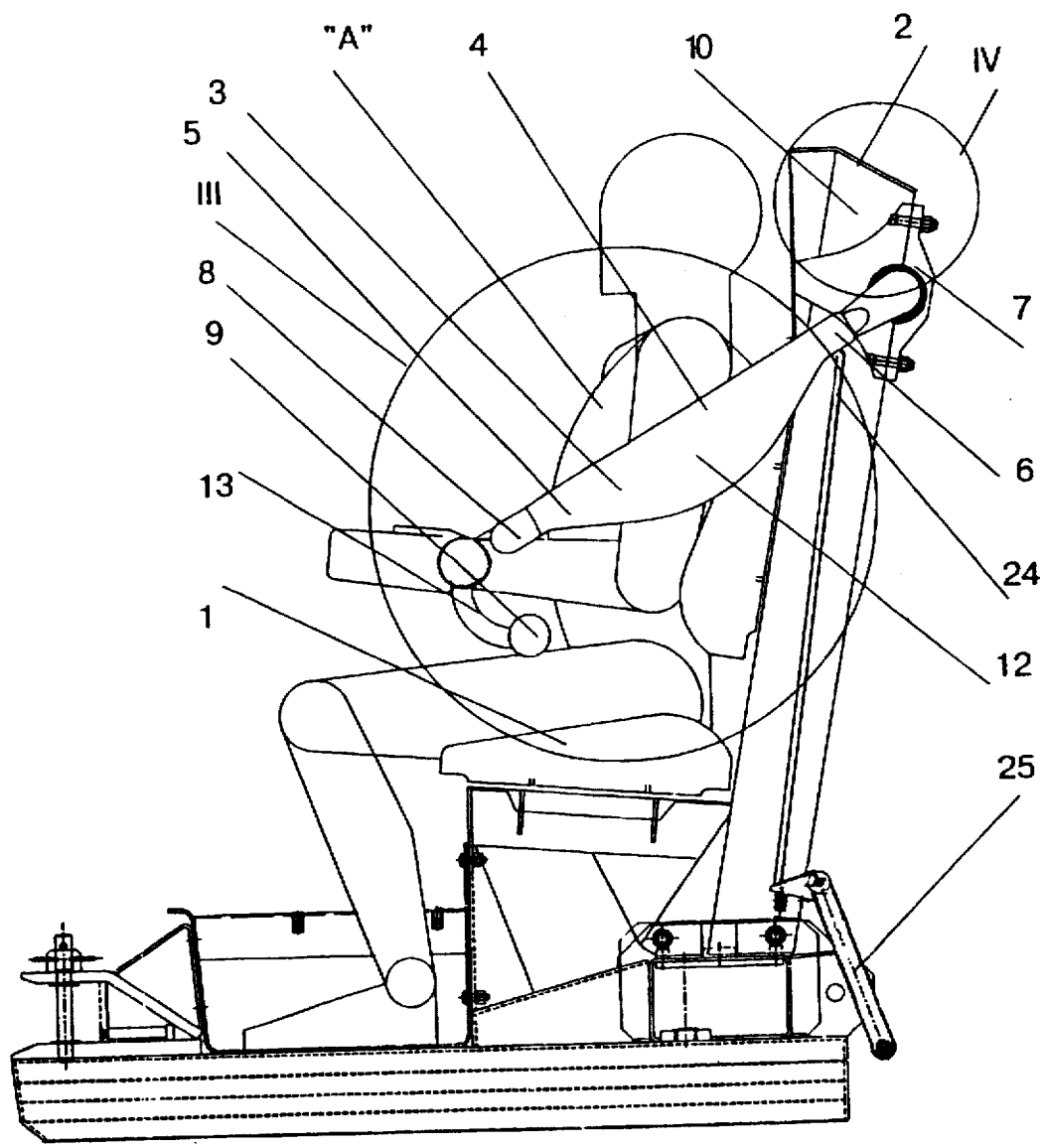
FIG. 1 is a view showing a Roller Coaster car provided with a device for restraining people.

Reference will now be made in detail to the presently preferred embodiments of the invention as illustrated in the accompanying drawings, in which like reference characters designate like or corresponding parts throughout the several drawings.

An embodiment of the present invention will be described below with reference to the accompanying drawings.

Figure 2:
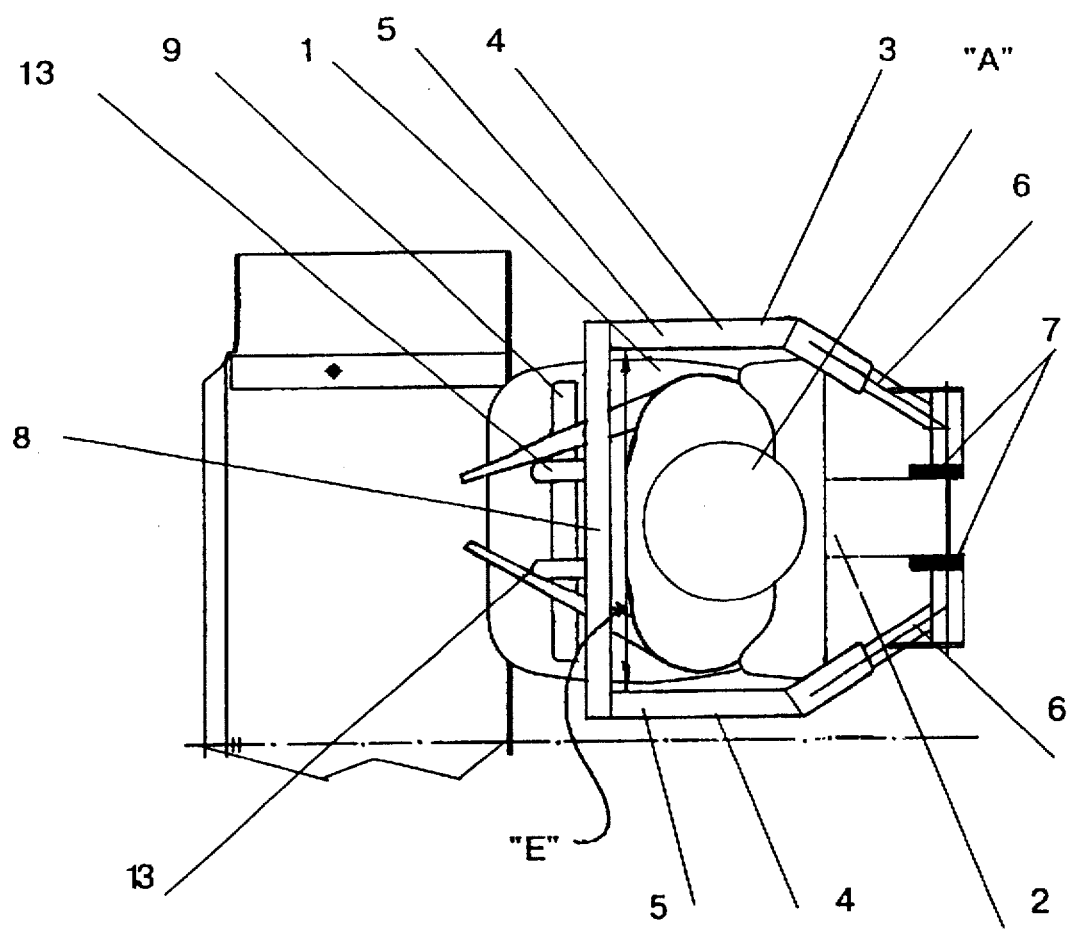
FIG. 2 is a view showing the top view of FIG. 1.

FIGS. 1 and 2 show the general and the top view of the device for restraining people on a moving unit (a Roller Coaster car) equipped with seat 1 with back 2 in whose upper part this restraining device is secured. The said restraining unit comprises:
  passenger body ("A") enveloping unit 3 with two side
    components 4, each having a front 5 and a back 6 end, the
    back ends 6 of each component 4 being joined to hinges
    7 fixed in the upper part of back 2 and the front ends 5
    being connected together by means of a transverse component 8, the space formed by the said side components 4 and transverse component 8 being intended for enveloping the passenger's body;
  transverse component 9 for resting against the passenger's
    thighs and rigidly fastened to the enveloping unit 3; and
  a lock unit 10 for restraining body enveloping unit 3 after
    transverse component 9 has stopped against the passenger's thighs, in such a way that it passes in the area of the passenger's forearms and belly.

Figure 3:
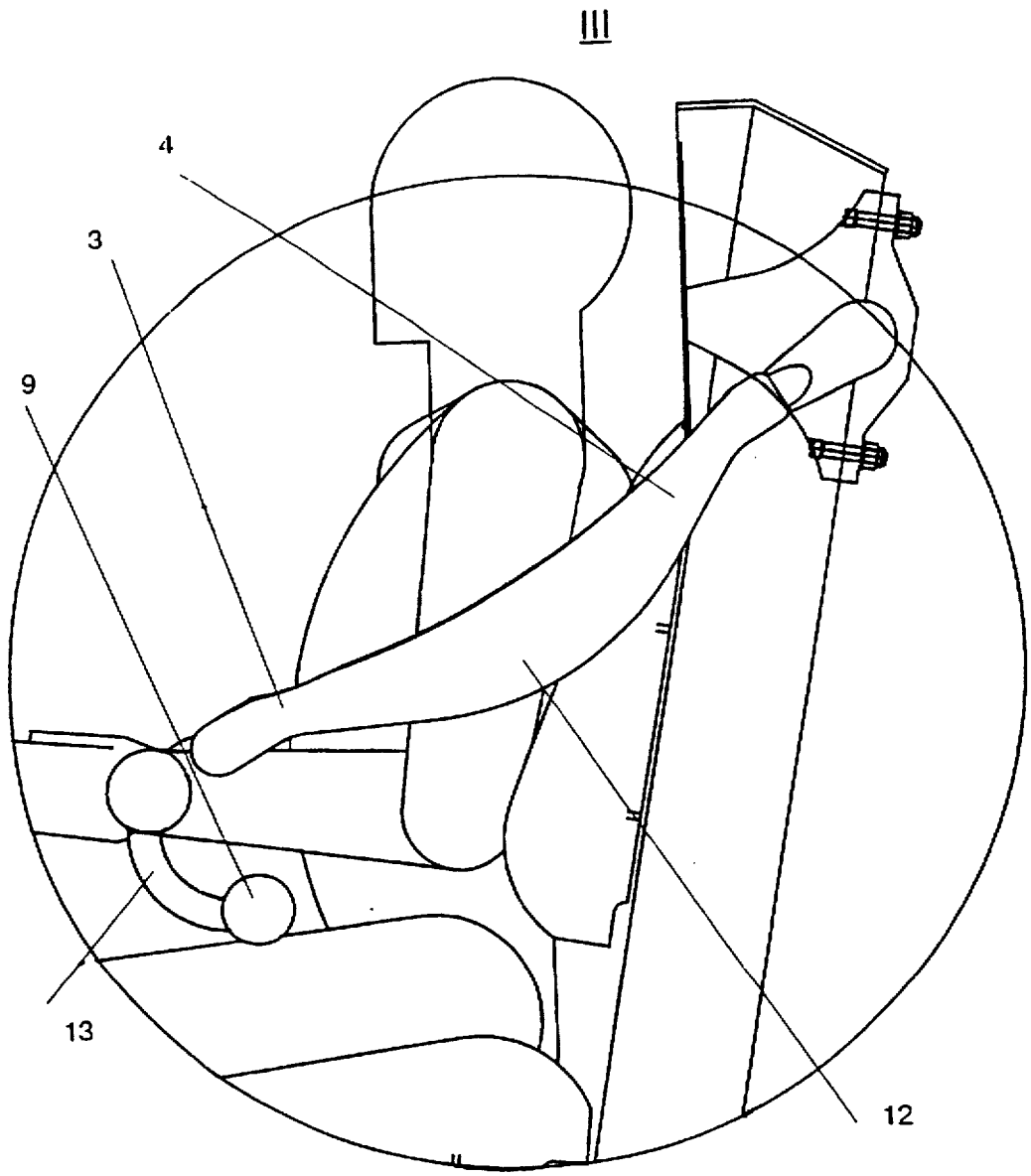
FIG. 3 is an enlarged view of the portion shown in the circle III in FIG. 1 with a modified shape of the side components.
Figure 6:
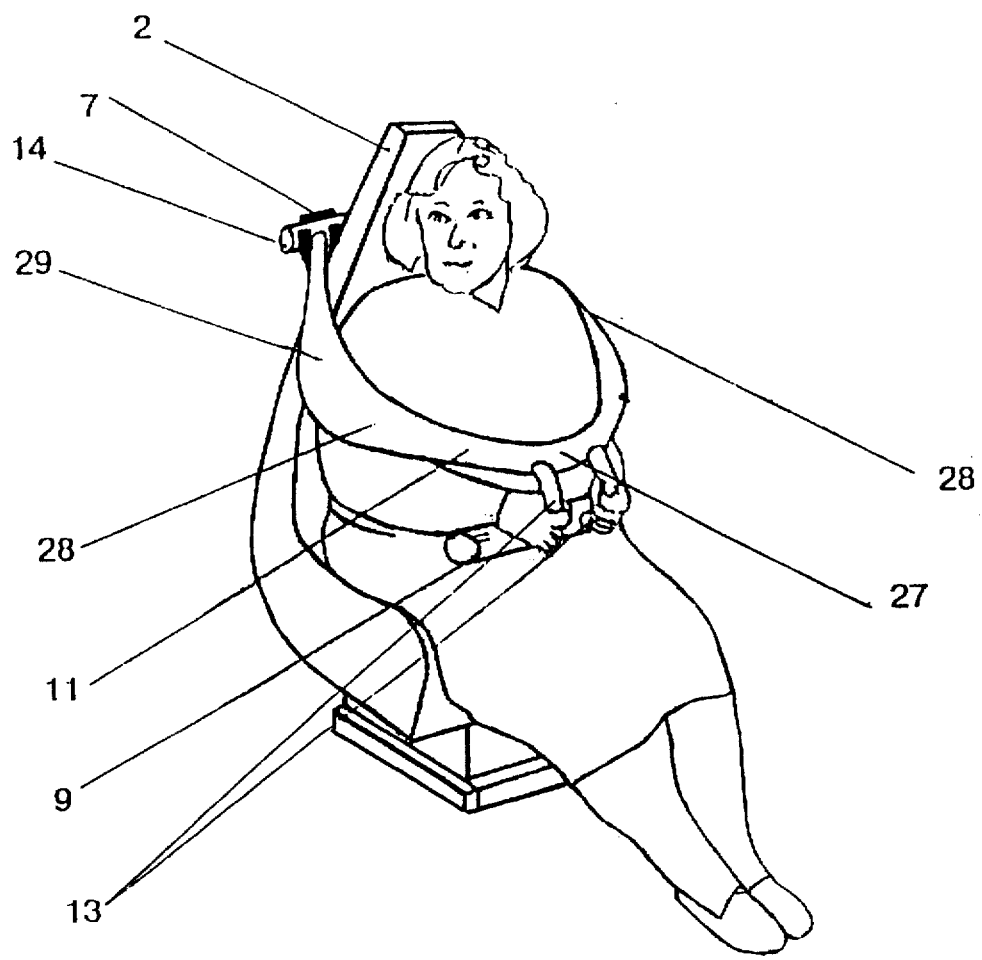
FIG. 6 is a view showing a model of the chair with a restraining device whose enveloping unit is made in the form of an arc-like component.
Figure 7:
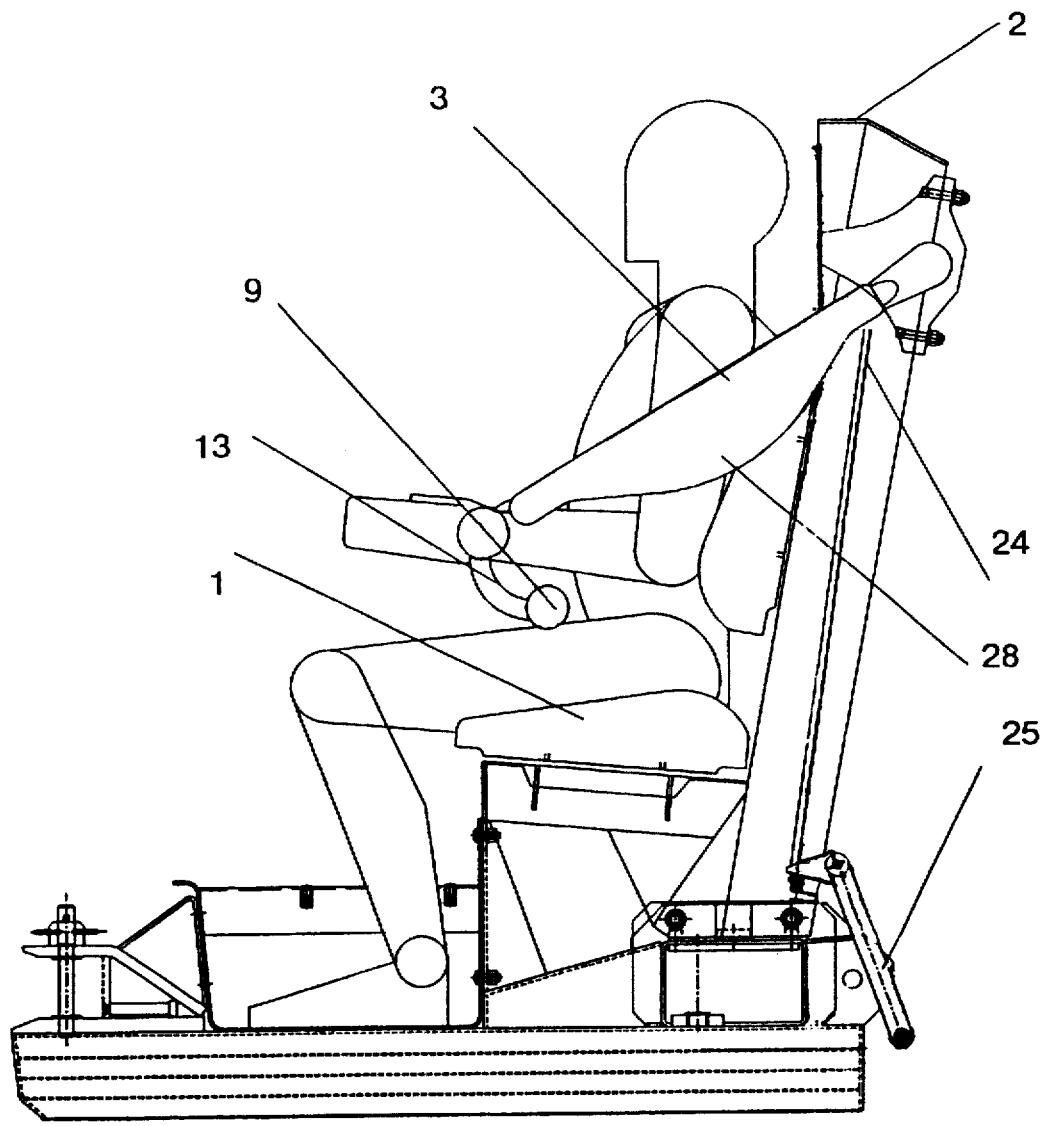
FIG. 7 is a view showing a Roller Coaster car with a device for restraining people whose enveloping unit is made in the form of an arc-like component.
Figure 9:
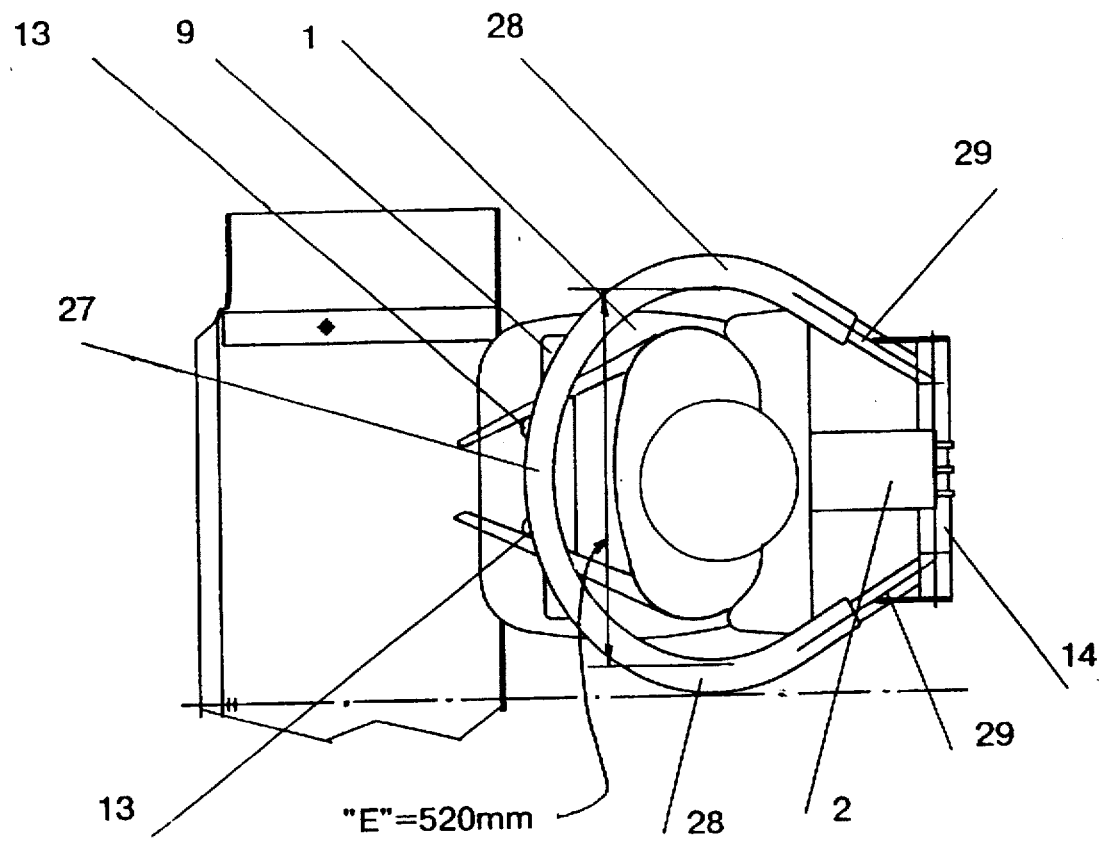
FIG. 9 is a view showing the top view of FIG. 7.

Side components 4 lie in the same plane or are curved towards seat 1, as is shown in FIG. 3. Side components 4 and transverse component 8 connecting their front ends 5 can be made in the form of one arc-like component 11, as is shown in FIGS. 6 and 9. The maximum distance "E" between side components 4 is greater than the width of a passenger's body in the area of the passenger's forearms and is equal to 400–600 mm, the preferred value being 520 mm.

Side components 4 have a broadening section 12 in the middle. Body enveloping unit 3 and transverse component 9 for resting against the thighs are coated with an elastic material (not shown in the drawing), for example, integral foam polyurethane.

The device is additionally provided with handles 13 which passengers can grasp during movement, handles 13 being rigidly attached to enveloping unit 3 and being made in the form of components rigidly connecting enveloping unit 3 with transverse component 9.

Transverse component 8 connecting side components 4 can be combined with transverse component 9 for resting against the passenger's thighs.

Figure 4:
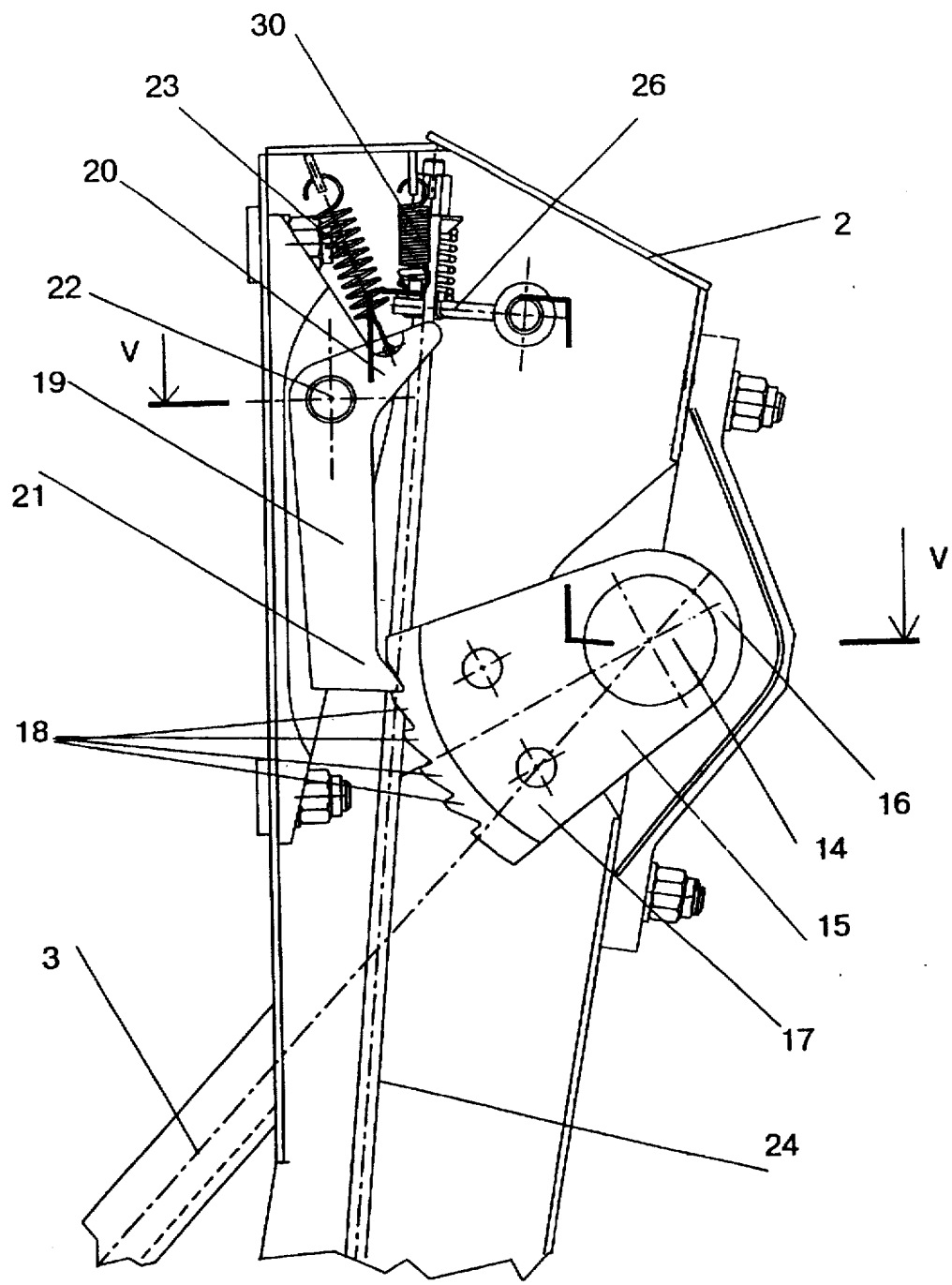
FIG. 4 is an enlarged view of the portion shown in the circle IV in FIG. 1 (the lock device).
Figure 5:
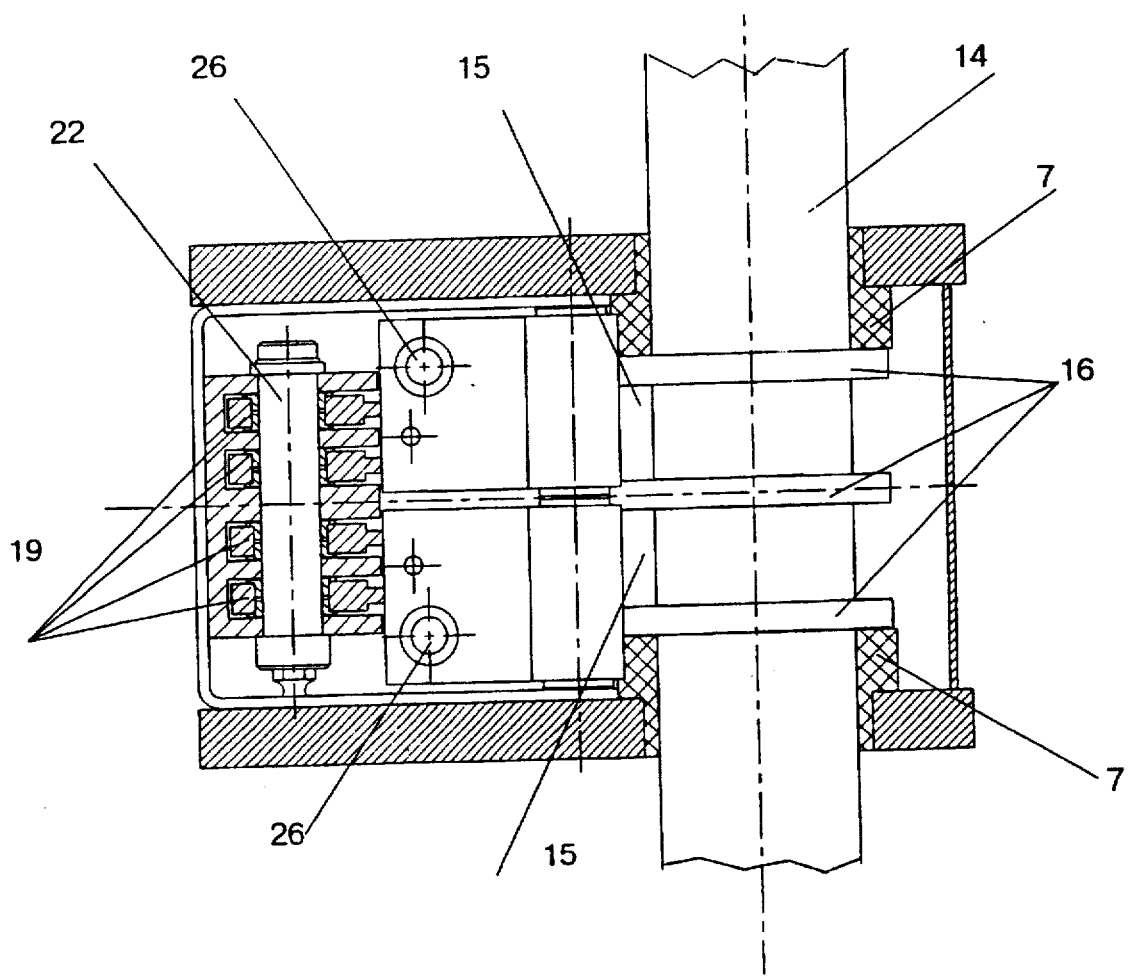
FIG. 5 is a partial sectional view along line V—V in FIG. 4.

FIG. 4 shows the upper part of lock unit 10 and FIG. 5 shows a view of this unit along the arrow indicated by roman numeral V in FIG. 4. In this case back ends 6 of side components 4 are joined by means of axle 14. Lock unit 10 comprises at least one gearing section 15 having two ends 16 and 17, one end 16 being rigidly connected to axle 14, and the other end 17 being provided with teeth. A pawl 19 has two ends 20 and 21 and an axle 22 is provided between the ends 20 and 21 hinged on back 2, one end 20 of pawl 19 being joined to back 2 through spring 23, and the other end 21 interacting with teeth 18 of gearing section 15. A control lever 24 interacts with the drive (not shown in the drawing) by its one end 25 and acts by its other end 26 on end 20 of pawl 19 loaded by spring 23.

FIGS. 6 through 9 show a model of a chair with the device for restraining people on a moving unit (a Roller Coaster car) and a specific embodiment comprising a passenger body enveloping unit 3 in the form of an arc-like component 11, having front part 27, two side parts 28, and two ends 29. Each end 29 is joined to hinges 7 or these ends are joined by axle 14, as is shown in FIG. 9, hinged in the upper part of back 2, with the space formed by the arc-like component 11 being intended for enveloping the passenger's body.

The transverse component 9 rests against the passenger's thighs and is rigidly fastened to the enveloping unit 3, and lock unit 10 secures the body enveloping unit 3 after transverse component 9 has stopped against the passenger's thighs.

Body enveloping unit 3 envelops the body in such a way that side parts 28 pass in the area of the passenger's forearms and front part 27 passes in the area of the passenger's belly. Side components 28 lie in the same plane or are curved towards seat 1. The maximum distance between side components 28 of the arc-like component 11 is greater than the width of a passenger's body in the area of the passenger's forearms.

The device is additionally provided with handles 13 which passengers can grasp during movement, handles 13 being rigidly attached to enveloping unit 3, being made in the form of components rigidly connecting enveloping unit 3 with transverse component 9.

Figure 8:
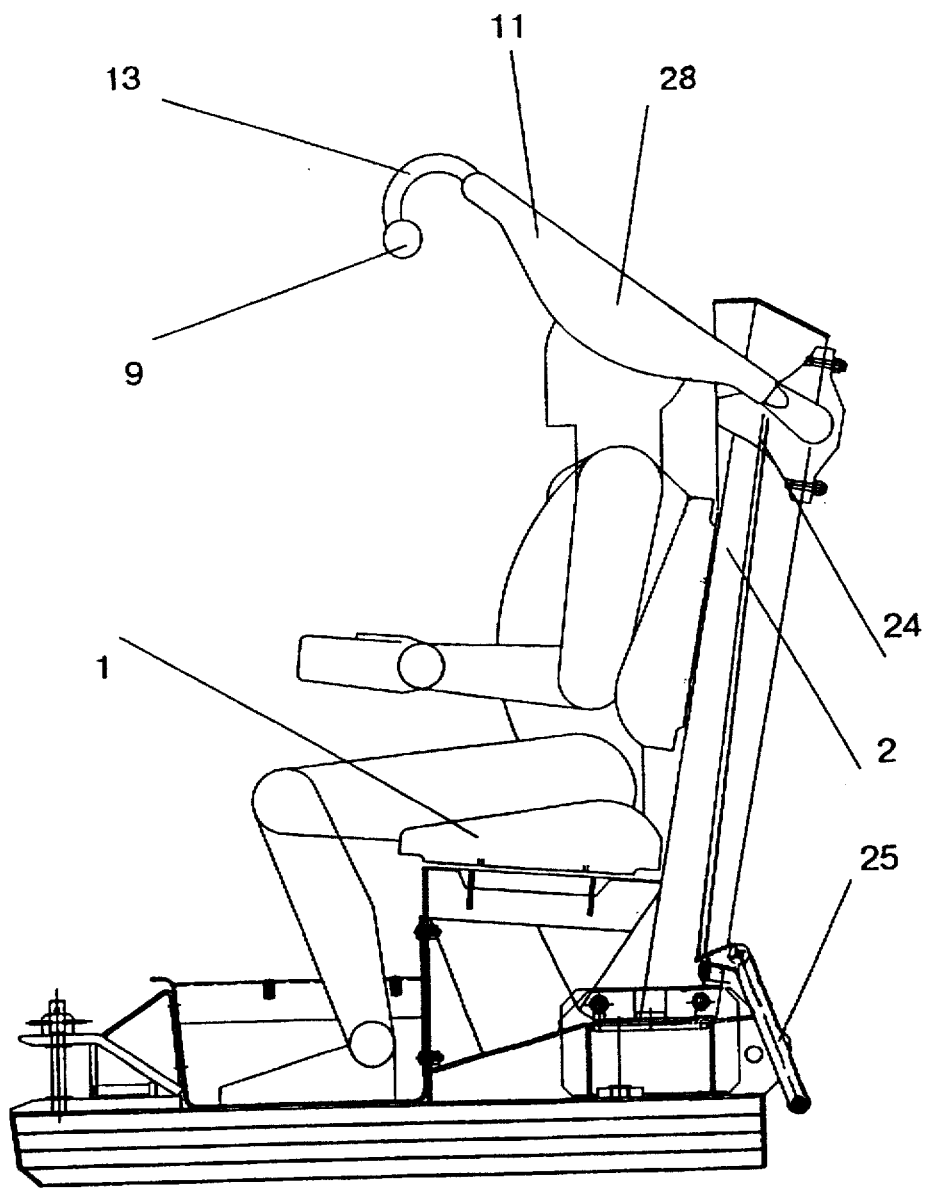
FIG. 8 is a view showing the device of FIG. 7 with the enveloping unit raised.

The device operates in the following way:
People (car passengers) take seat 1 and pull down body
  enveloping unit 3 as far as it will go against the thighs by
  means of the transverse component 9 (with the maximum
  distance "E" between side components exceeding the
  passenger's body width in the area of the passenger's
  forearms). Side components 4 envelop the passenger in
  the area of the passenger's forearms, and the passenger is
  able to hold on to handles 13. The shape of the side
  components 4 of body enveloping unit 3 and the dimension "E" have been selected in conformity with anthropological measurement data with a 95% inclusion of all potential passengers. One specific device has been designed for passengers ranging from 3–4-year-old children through adults 2 and more meters tall and weighing about 150 kg, and the "E" dimension has been selected in the range of 400–600 mm. The preferred value of the "E" dimension is 520 mm. In this case side components 4 of body enveloping unit 3 envelop the passenger's forearms and prevent the passenger from leaning sideways and slipping out. Pawl 19 of lock unit 10 interacts with gearing section 15 and prevents the reverse motion of body enveloping unit 3. Lock unit 10 is released in the following way: the free end 25 of control level 24 is displaced upward (either by an operator's hand or under the action of a drive not shown in the drawing), and the other end 25 of control lever 24 acts on end 20 of pawl 19 spring-loaded by spring 23. Pawl 19 turns around axle 22, is released from engagement with teeth 18 of gearing section 15, and releases gearing section 15 and body enveloping unit 3 rigidly connected with the latter. The passenger or the operator raises body enveloping unit 3 into the upper position (FIG. 8). One can facilitate the arc rise into the upper position by installing springs or an air damper (not shown in the drawing), or by any other means. When control level 24 is lowered down all the components of the device return to the initial position under the action of springs 23 and 30. Pawl 19 and gearing section 15 can each be made in the form of several individual components, as is shown in FIG. 5, which increases the safety of the lock unit.

The suggested design of the device for restraining people on a moving unit possesses all features required for secure restraining of people (passengers) in a car moving along paths of complex spatial shape, such as, for example, Roller Coaster paths, and ensures comfort and safety of passengers. Passengers having a wide range of anthropological characteristics are reliably pressed down against the seat and the back in the area of the upper part of their thighs, the passenger's head is not at risk of being bumped against the upper part of body enveloping unit 3, and the passenger cannot slip out sideways as body enveloping unit 3 envelops the passenger tightly in the area of the passenger's forearms. The passenger is not able to unlock the device while in the car, moreover, in the process of motion. The device is simple to fabricate, does not have any electrical, hydraulic or pneumatic components, is safe and convenient both for passengers and personnel.

This device can be applied in industry. A sample Roller Coaster car with the above described device has been manufactured and successfully tested, with the advantages of the device of the present invention having been confirmed in the course of testing.

The device of the present invention ensures simultaneously that the passenger is restrained in the area of the upper part of his thighs, which is the most reliable restraint, and that sideways displacements of the upper body are limited in the required range of the passenger's anthropometric characteristics without adjusting the size of the enveloping unit and the position of the place of its attachment to the chair.

Additional embodiments of the present invention will be apparent to those skilled in the art from consideration of the specification and practice of the present invention disclosed herein. It is intended that the specification and examples be considered as exemplary only, with the true scope of the present invention being indicated in the following claims.

I claim:

1. A restraining device for restraining a passenger on a moving unit, comprising:

a passenger body enveloping unit having two side components each having a front end and a back end, the back end of each of the side components being joined to hinges fixed in an upper portion of a back of a seat of the moving unit, and the front end of each of the side components being connected together to form a space for enveloping the passenger;

a transverse component rigidly fastened to the passenger body enveloping unit for resting against the passenger's thighs when the passenger body enveloping unit envelops the passenger; and a lock unit for restraining the passenger body enveloping unit after the transverse component has come to rest against the passenger's thighs such that the passenger body enveloping unit envelops the passenger in an area of the passenger's forearms and belly.

2. The device according to claim 1, wherein the side components of the passenger body enveloping unit are integrally formed as one arc-like component.

3. The device according to claim 1, wherein the side components of the passenger body enveloping unit lie in a same plane.

4. The device according to claim 1, wherein the side components of the passenger body enveloping unit are curved toward the seat of the moving unit.

5. The device according to claim 1, wherein a maximum distance between the side components of the passenger body enveloping unit is greater than a width of the passenger's body in the area of the passenger's forearms.

6. The device according to claim 5, wherein the maximum distance is in the range of 400–600 mm.

7. The device according to claim 6, wherein the maximum distance is approximately equal to 520 mm.

8. The device according to claim 1, wherein a middle portion of the side components of the passenger body enveloping unit include a broadening section.

9. The device according to claim 1, wherein the passenger body enveloping unit and the transverse component are coated with an elastic material.

10. The device according to claim 9, wherein the elastic material comprises integral foam polyurethane.

11. The device according to claim 1, further comprising handles rigidly attached to the passenger body enveloping unit, said handles being graspable by the passenger during movement of the moving unit.

12. The device according to claim 11, wherein said handles rigidly connect the passenger body enveloping unit to the transverse component.

13. The device according to claim 1, wherein the back end of each side component of the passenger body enveloping unit are joined by an axle, and wherein the lock unit comprises:

at least one gearing section having first and second ends, the first end of the gearing section being rigidly connected to the axle joining the side components of the passenger body enveloping unit, and the second end of the gearing section being provided with teeth;

a pawl having a first and second ends and an axle between the first and second ends and hinged on the back, the first end of the pawl being joined to the back of the seat of the moving unit through a spring, and the second end of the pawl interacting with the teeth provided on the second end of the gearing section; and a control lever having first and second ends, the first end of the control lever interacting with a drive, and the second end of the control lever acting on the spring joining the first end of the pawl to the back of the seat of the moving unit.

14. The device according to claim 1, wherein the transverse component connects together the front end of each of the side components of the passenger body enveloping unit.

15. A restraining device for restraining a passenger on a moving unit, comprising:

an arc-like passenger body enveloping unit having a front part, two side parts and two ends, each end being joined to hinges fixed in an upper portion of a back of a seat of the moving unit, and the passenger body enveloping unit forming a space for enveloping the passenger;

a transverse component rigidly fastened to the passenger body enveloping unit for resting against the passenger's thighs when the passenger body enveloping unit envelops the passenger; and a lock unit for restraining the passenger body enveloping unit after the transverse component has come to rest against the passenger's thighs such that the side parts of the passenger body enveloping unit pass in an area of the passenger's forearms and the front part of the passenger body enveloping unit passes in an area of the passenger's belly.

16. The device according to claim 15, wherein the side parts of the passenger body enveloping unit lie in a same plane.

17. The device according to claim 15, wherein the side parts of the passenger body enveloping unit are curved toward the seat of the moving unit.

18. The device according to claim 15, wherein a maximum distance between the side parts of the passenger body enveloping unit is greater than a width of the passenger's body in the area of the passenger's forearms.

19. The device according to claim 15, further comprising handles rigidly attached to the passenger body enveloping unit, said handles being graspable by the passenger during movement of the moving unit.

20. The device according to claim 19, wherein said handles rigidly connect the passenger body enveloping unit to the transverse component.

* * * * *